Feb. 23, 1943.  H. F. LIEBRECHT  2,312,105
CONTINUOUSLY VARIABLE GEAR
Filed May 8, 1940

INVENTOR
BY Heinrich F. Liebrecht
ATTORNEYS.

Patented Feb. 23, 1943

2,312,105

UNITED STATES PATENT OFFICE 2,312,105

CONTINUOUSLY VARIABLE GEAR

Heinrich Fritz Liebrecht, Crays Hill, Billericay, England

Application May 8, 1940, Serial No. 333,999
In Great Britain May 11, 1939

3 Claims. (Cl. 74—285)

My invention relates to an improvement of infinitely variable gears. It is known to use epicyclic gears for the continuous change of the ratio of transmission. This change is effected by connecting the driving centre wheel of the gear with its outside wheel over a continuously variable gear or in similar manner. In this construction a large part of the power is transmitted by the continuously variable gear, because the output taken from the arm carrying the intermediate planet wheels is composed of the power of the centre wheel and the power of the outside wheel which itself is transmitted over the continuously variable gear.

Figure 1:
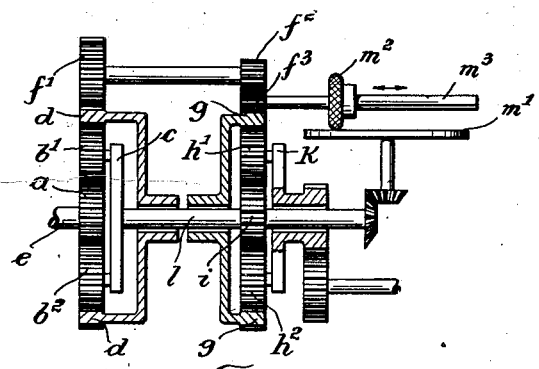
Figure 2:
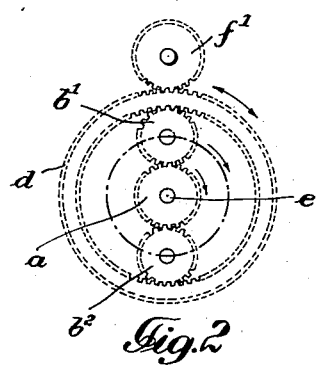
Figure 3:
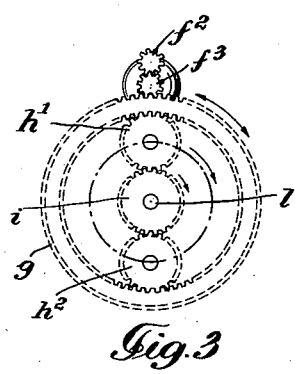

This invention concerns a continuously variable gear consisting of two epicyclic gears interconnected with each other in such a manner that the power is transmitted over the two epicyclic gears using a known continuously variable gear exclusively as a controlling device. This is effected by splitting the driving power in one epicyclic gear into two components which are recombined in the second epicyclic gear the wheels of which are connected to the wheels of the first. In Fig. 1 of the accompanying drawing $a$, $b^1$, $b^2$, $c$ shows the first epicyclic gear, Fig. 2 shows this in detail. Figure 3 shows the second epicyclic gear. The centre wheel $a$ of the first train is driven by the driving shaft $e$. When the centre wheel $a$ is driven, the disc $c$ carrying the intermediate wheels $b^1$, $b^2$ revolves in the same direction imparting to the outside wheel $d$ a rotation in the opposite direction or in the same direction. This depends on its number of revolutions and the velocity characteristic of the gear. The tangential force imparted to it works in the opposite direction within the normal speed range. The outside wheel $d$ by means of the wheels $f^1$, $f^2$, $f^3$ drives the outer wheel $g$ of the second epicyclic gear. The disc $c$ of the first train is connected with the centre wheel $i$ of the second train by the intermediate shaft $l$. This second epicyclic train is shown in detail in Fig. 3. The disc $k$ carrying the intermediate wheels $h^1$ and $h^2$ drives the driven shaft $p$ by means of wheels $r$ and $s$. Its driving power and its velocity is determined by the centre wheel $i$ and the outside wheel $g$. The ratio of their velocities and their direction as well as those of the connected wheels $c$ and $d$ is controlled by a friction gear $m^1$, $m^2$, $m^3$ or another continuously variable gear. For example disc $k$ does not revolve at all when $g$ and $i$ rotate at equal circumferential speed in opposite directions and attains its maximum speed when $i$ stands still and $g$ rotates at high speed. All intermediate speeds are obtained by changing the ratio of the speeds of $g$ and $i$ by means of the controlling device $m^1$, $m^2$, $m^3$. It appears that the continuously variable gear determining the velocity of the driven disc $k$ transmits only a small part of the energy within a certain speed range. By reversing the relative direction of rotation of $g$ and $i$, for example by shifting $m^2$ a certain distance to the other side of $m^1$, it is possible to reverse the direction of rotation of the output shaft. It is possible to repeat this process of splitting forces and recombining them by means of further epicyclic gears thus further decreasing the power to be transmitted by the auxiliary gear. It depends on the manner of connecting the two epicyclic gears whether it is necessary to reverse the direction of rotation of one component. I wish it to be understood that I do not desire to be limited to the constructive details here shown and described for obvious modifications will occur to a person versed in the art.

I claim:

1. Continuously variable gear comprising in combination, a driving shaft, a driven shaft and two trains of gears inserted between said shafts, the first train of gears being operatively connected with said driving shaft for direct power transmission, while the second train is operatively connected only with said first train and with said driven shaft, means being provided for splitting the driving power of said first train into two components, means for re-combining said components in said second train, and a continuously variable gear arranged to control the speed of revolution of said two trains.

2. The combination of claim 1, in which the two trains of gears are triple epicyclic gears.

3. A continuously variable gear comprising in combination, a driving shaft and two triple epicyclic gears inserted between said two shafts, each gear comprising a sun wheel, two planet wheels, an outer wheel and a planet wheel carrier, the sun wheel of the first gear being arranged to be driven directly by said driving shaft, an intermediate shaft directly connected to the planet wheel carrier of said first gear and carrying the sun wheel of said second gear, a friction gear having two shafts, one being operatively connected to be driven by said intermediate shaft, the other being operatively connected for motion transmission to the outer wheels of said two epicyclic gears, and means on said driven shaft for coupling said shaft with the planet wheel carrier of said second gear.

HEINRICH FRITZ LIEBRECHT.